US012729315B2

(12) United States Patent
Guaitoli et al.

(10) Patent No.: US 12,729,315 B2
(45) Date of Patent: Sep. 8, 2026

(54) CERAMIC INK FOR DIGITAL PRINTING, PREFERABLY FOR INKJET PRINTING

(71) Applicant: SICER S.P.A., Fiorano Modenese (IT)

(72) Inventors: Lucia Guaitoli, Fiorano Modenese (IT); Alan Nappa, Fiorano Modenese (IT); Fabio Terzi, Fiorano Modenese (IT); Sergio Marcaccioli, Fiorano Modenese (IT); Giuliano Ferrari, Fiorano Modenese (IT)

(73) Assignee: SICER S.P.A., Fiorano Modenese (IT)

( * ) Notice: Subject to any disclaimer, the term of this patent is extended or adjusted under 35 U.S.C. 154(b) by 480 days.

(21) Appl. No.: 18/005,375

(22) PCT Filed: Jul. 13, 2021

(86) PCT No.: PCT/IB2021/056299

§ 371 (c)(1),
(2) Date: Jan. 13, 2023

(87) PCT Pub. No.: WO2022/013742

PCT Pub. Date: Jan. 20, 2022

(65) Prior Publication Data

US 2023/0265302 A1 Aug. 24, 2023

(30) Foreign Application Priority Data

Jul. 13, 2020 (IT) ........................ 102020000016981

(51) Int. Cl.

| | |
|---|---|
| ***C09D 11/322*** | (2014.01) |
| ***B41J 2/01*** | (2006.01) |
| ***B41J 2/21*** | (2006.01) |
| ***B41M 5/00*** | (2006.01) |
| ***C04B 41/00*** | (2006.01) |
| ***C04B 41/45*** | (2006.01) |
| ***C04B 41/48*** | (2006.01) |
| ***C04B 41/83*** | (2006.01) |
| ***C09D 11/033*** | (2014.01) |
| ***C09D 11/037*** | (2014.01) |
| ***C09D 11/102*** | (2014.01) |
| ***C09D 11/107*** | (2014.01) |
| ***C09D 11/36*** | (2014.01) |

(52) U.S. Cl.

CPC ............... *C09D 11/322* (2013.01); *B41J 2/01* (2013.01); *B41J 2/2107* (2013.01); *B41M 5/0047* (2013.01); *B41M 5/007* (2013.01); *C04B 41/00* (2013.01); *C04B 41/0072* (2013.01); *C04B 41/009* (2013.01); *C04B 41/4543* (2013.01); *C04B 41/488* (2013.01); *C04B 41/83* (2013.01); *C09D 11/033* (2013.01); *C09D 11/037* (2013.01); *C09D 11/102* (2013.01); *C09D 11/107* (2013.01); *C09D 11/36* (2013.01)

(58) Field of Classification Search

CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | |
|---|---|---|---|
| 7,677,720 B2 | 3/2010 | Vincent et al. | |
| 7,803,221 B2 | 9/2010 | Magdassi et al. | |
| 2008/0210122 A1* | 9/2008 | Magdassi ............... | C09D 11/30 523/160 |

(Continued)

FOREIGN PATENT DOCUMENTS

| | | |
|---|---|---|
| EP | 2233539 | 9/2010 |
| KR | 20190075226 | 7/2019 |

*Primary Examiner* — Manish S Shah
(74) *Attorney, Agent, or Firm* — ASLAN LAW, P.C.

(57) ABSTRACT

A ceramic ink for digital printing, preferably for inkjet printing, comprises at least one solid part comprising at least one ceramic pigment or dye; and at least one liquid part into which said ceramic pigment or dye is dispersed and comprising one or more vehicles and/or one or more dispersants; wherein at least one of either the one or more vehicles or the one or more dispersants comprises one or more organic or inorganic silicon compounds.

13 Claims, No Drawings

(56) References Cited

U.S. PATENT DOCUMENTS

2011/0160389 A1 6/2011 Bubat et al.
2011/0249056 A1* 10/2011 Weingartner ........ B41M 5/0047 347/20
2013/0342593 A1* 12/2013 Fornara .................. C04B 41/52 106/31.65
2014/0291313 A1 10/2014 Dufour et al.
2017/0298245 A1* 10/2017 Ferrari .................... C04B 41/83
2019/0337862 A1* 11/2019 Hamm ................ C04B 41/5041
2021/0395544 A1* 12/2021 Fernandez Vazquez .................... C09D 11/36
2023/0117230 A1* 4/2023 Schneider .............. C09D 11/38 347/100

* cited by examiner

CERAMIC INK FOR DIGITAL PRINTING, PREFERABLY FOR INKJET PRINTING

CROSS-REFERENCE TO RELATED APPLICATIONS

This application claims priority to IT patent application No. 102020000016981 filed on Jul. 13, 2020, and this application claims priority to and is a 371 of international PCT Application No. PCT/IB2021/056299 filed on Jul. 13, 2021, the entire contents of which are hereby incorporated by reference.

TECHNICAL FIELD

The present invention relates to a ceramic ink for digital printing, preferably for inkjet printing.

BACKGROUND ART

With reference to the field of decoration of ceramic manufactured articles, it is well known that inkjet printing, in this case digital printing, has become very popular in recent years.

Ceramic decoration by digital printing involves, before firing the ceramic manufactured article, depositing a layer of ink on the surface of the manufactured article itself, which is then fired.

Firing is a fundamental operation in the technological process of producing ceramic manufactured articles as it causes the formation of the ceramic material, transforming the raw materials of the mixture into new crystalline and vitreous compounds that give the fired ceramic manufactured article special mechanical and aesthetic properties.

Known inks are composed of a solid inorganic part, the ceramic pigment, and a liquid part of an organic nature which may account for more than 75% and is made up of a medium and a dispersant, possibly combined with other additives of the type of super dispersants and/or modifiers of viscosity.

The function of the organic fraction is to convey the ceramic pigment to the surface of the manufactured article and it is subsequently eliminated during firing.

Generally, the firing of ceramic manufactured articles takes place at high temperatures ranging from 750° C. to 1250° C. However, despite these temperatures, the combustion of the organic emissions is never complete due to the countercurrent operation of the ceramic kilns, which involves the movement of the ceramic manufactured articles in the opposite direction to the direction of escape of the combustion manufactured articles from the ceramic kilns. As a result, the organic substances that decompose and evaporate during preheating, mixing with the manufactured articles of combustion, are dragged by the gaseous flow towards the kiln's emission stack, and therefore towards colder areas.

These emissions, therefore, do not reach the heat levels necessary for complete combustion and are, therefore, emitted as such into the atmosphere, thus causing the phenomenon of the presence of odors in the area affected by the fallout of the fumes caused by the formation of low-odor compounds. In recent years, the presence of low-odor threshold compounds has led to numerous reports of odors in the ceramic districts, which in many cases have been found to come from the stacks of the ceramic kilns themselves.

In order to limit at least some of these drawbacks, Ministerial Decree Dec. 7, 1990 sets a limit for common organic substances in emissions from ceramic kilns in concentrations related to mass flows.

In detail, the control of emissions of volatile organic substances (VOC) from ceramic kilns currently envisages the verification of emissions expressed overall as total organic carbon (TOC) or as the sum of the individual organic compounds.

At present, emissions of total organic carbon must be below 50 mg/$Nm^3$, which is a major obstacle to the widespread use of digital printing.

To meet this requirement at least in part, digital inks with low TOC emissions are known.

However, even such inks are not without their drawbacks due to the fact that the solvents they contain have a low boiling temperature.

This characteristic leads to a number of problems related to the dryness of the inks themselves, resulting in increased interaction of the solid part of the ink with the water vapor present along the manufactured articleion lines, which forms encrustations as it exits the print heads.

In order to overcome at least some of these drawbacks, a number of inks with different properties have been developed.

In this regard, patent documents no. US2017/0298245, EP2233539, US2019/0337862, US2011/0160389 and U.S. Pat. No. 7,677,720 describe some types of inks having different formulations, having different rheological properties but which do not satisfactorily overcome the aforementioned drawbacks related to harmful emissions and low-odor threshold.

In detail, patent document no. US2017/0298245 describes a ceramic ink for digital printing comprising surfactants involving the use of silicon compounds. However, the use of the above substances does not contribute at all to the reduction of odorous emissions.

Furthermore, patent document US2019/0337862 describes an ink comprising ceramic pigments in the form of flakes comprising silicon-based compounds but which, like the above documents, does not in any way drastically reduce odorous and harmful emissions.

Furthermore, patent documents U.S. Pat. No. 7,803,221, US2014/291313 and KR20190075226 describe inks that in no way overcome the problem related to odorous and harmful emissions without affecting the printing quality.

In this regard, U.S. Pat. No. 7,803,221 describes an ink for printing on ceramic surfaces wherein the solid portion of the ink comprises silicon-based compounds which in no way diminish the formation of odorous and harmful emissions. US2014/291313 describes a process for the manufacture of ceramic manufactured articles involving the use of a resin comprising inorganic silicon-based compounds and which, when heated, cross-links and remains in the form of an organic material that has no effect on the reduction of said odorous and harmful emissions.

Finally, KR20190075226 describes the use of surfactants comprising silicon-based compounds which, similarly to the teachings in accordance with the preceding documents, does not provide any effective solution for the reduction of odorous emissions.

In addition, known inks tend to dry very quickly leading to clogging of the nozzles and of the print heads and causing damage to the print heads themselves resulting in lower efficiency and printing quality.

It therefore appears evident that no background art teaching provides clear and precise indications as to a solution for drastically reducing odor and harmful emissions while maintaining good printing quality.

For this purpose, the need is particularly felt to look for ceramic inks which make it possible to significantly reduce TOC emissions while complying with legal limits and maintaining printing efficiency and ceramic color rendering unchanged.

DESCRIPTION OF THE INVENTION

The main aim of the present invention is to provide a ceramic ink for digital printing, preferably for ink-jet printing, which can significantly reduce TOC emissions while ensuring high printing efficiency and ceramic color rendering.

Within this aim, one object of the present invention is to provide a ceramic ink for digital printing, preferably for inkjet printing, which makes it possible to significantly reduce the content of organic components compared to inks of known type.

A further object of the present invention is to provide a ceramic ink for digital printing, preferably for inkjet printing, which has high lubricating power during dispensing by the print heads, avoiding clogging and considerably reducing wear and tear and the risk of breakage of the print heads.

Another object of the present invention is to devise a ceramic ink for digital printing, preferably for inkjet printing which allows overcoming the aforementioned drawbacks of the prior art within a simple, rational, easy and effective to use as well as affordable solution.

The aforementioned objects are achieved by the present ceramic ink for digital printing, preferably for inkjet printing having the characteristics of the independent claim(s) 1.

In addition, the aforementioned objects are achieved by the method for the manufacture of a ceramic manufactured article having the characteristics of the claimed invention.

Furthermore, the aforementioned objects are achieved by the use of organic or inorganic silicon compounds having the characteristics of the claimed invention.

Embodiments of the Invention

A first aspect of the present invention relates to a ceramic ink for digital printing, preferably for inkjet printing.

It is specified that within the scope of the present disclosure, the expressions "ceramic manufactured article" or "ceramic material" relate to materials that are optionally also vitreous.

It is specified that within the scope of the present disclosure, the expression "digital printing" relates to a generic printing system where the shape to be printed is generated through electronic processes and impressed directly on the material to be printed.

Preferably, the inkjet printing is of the digital type.

By way of example, the inkjet printing comprises drop-on-demand technology of the piezoelectric type.

This type of inkjet printing allows the application of a weight between 40-200 $g/m^2$, a resolution of 180-720 dpi and a drop volume between 80 and 200 μl. The ceramic manufactured articles comprise a main body covered by one or more layers of material selected alternatively from ceramic, glass or organic.

For example, such manufactured articles are intended to be used as coverings for floors, external and internal walls or as a furnishing element such as tableware, kitchen tops and parts of furniture.

Within the scope of the present disclosure, the term "agglomerates" relates to tiles or slabs made of inorganic material of the type of quartz or glass, which form a coherent material thanks to the use of an inorganic or organic polymeric binder.

The ceramic ink comprises:

a solid part comprising at least one ceramic pigment and/or dyeing pigment; and a liquid part into which the ceramic pigment and/or dyeing pigment is dispersed and comprising one or more vehicles and/or one or more dispersants.

Within the scope of the present disclosure, the expression "one or more vehicles" indicates that the ink may comprise a plurality of vehicles, either belonging to the same chemical type (e.g. polysilanes having possibly different molecular weights), or belonging to different chemical types (e.g. polysilanes and paraffins).

Similarly, the expression "one or more dispersants" indicates that the ink may comprise a plurality of dispersants, either belonging to the same chemical type (e.g. acrylic polymers having possibly different molecular weights), or belonging to different chemical types (e.g. acrylic and polyurethane polymers). In detail, the ceramic pigment is of synthetic or natural origin. Within the scope of the present disclosure, the expression "ceramic pigment" relates to inorganic compounds, both dyeing and non-dyeing, adapted to obtain technical and/or aesthetic effects on the ceramic manufactured article, while the expression "dyeing pigment" relates to organic compounds.

By way of example, the ceramic pigment is selected from the list comprising:

feldspar;

quartz;

fritted glass;

wollastonite;

pseudowollastonite;

alumina;

mullite;

bismuth vanadate;

dolomite;

ulexite;

colemanite;

silicon oxide;

zirconium oxide;

zirconium silicate;

I titanium dioxide;

antimony nickel titantium oxide yellow (EINICS 232-353-3; CAS 8007-18-9);

pyrochlore, antimony lead yellow (EINICS 232-382-1; CAS 8012-00-8);

aluminium yttrium trioxide (EINICS 234-443-8; CAS 12003-86-0);

dichromium zinc tetraoxide (EINICS 234-637-2; CAS 12018-19-8);

diiron magnesium tetraoxide (EINICS 235-107-3; CAS 12068-86-9);

chromium iron oxide (EINICS 235-790-8; CAS 12737-27-8);

tricobalt bis(orthophosphate) (EINICS 236-655-6; CAS 13455-36-2);

cobalt titanate green spinel (EINICS 269-047-4; CAS 68186-85-6);

cobalt zinc aluminate blue spinel (EINICS 269-049-5; CAS 68186-87-8);

zinc iron chromite brown spinel (EINICS 269-050-0; CAS 68186-88-9);

chrome antimony titanium buff rutile (EINICS 269-052-1; CAS 68186-90-3);

copper chromite black spinel (EINICS 269-053-7; CAS 68186-91-4);

chrome tungsten titanium buff rutile (EINICS 269-054-2; CAS 68186-92-5);

tin vanadium yellow cassiterite (EINICS 269-055-8; CAS 68186-93-6);

manganese ferrite black spinel (EINICS 269-056-3; CAS 68186-94-7);

zirconium vanadium blue zircon (EINICS 269-057-9; CAS 68186-95-8);

spinels, chromium iron manganese zinc brown (EINICS 269-058-4; CAS 68186-96-9);

iron cobalt chromite black spinel (EINICS 269-060-5; CAS 68186-97-0);

manganese alumina pink corundum (EINICS 269-061-0; CAS 68186-99-2);

titanium vanadium antimony grey rutile (EINICS 269-062-6; CAS 68187-00-8);

I vanadium zirconium yellow baddeleyite (EINICS 269-063-1; CAS 68187 Jan. 9);

spinels, iron titanium brown (EINICS 269-064-7; CAS 68187-02-0);

spinels, cobalt tin grey (EINICS 269-066-8; CAS 68187 May 3);

cobalt chromite blue green spinel (EINICS 269-072-0; CAS 68187 Nov. 1);

I chrome tin pink sphene (EINICS 269-073-6; CAS 68187 Dec. 2);

zirconium praseodymium yellow zircon (EINICS 269-075-7; CAS 68187-15-5);

chrome alumina pink corundum (EINICS 269-083-0; CAS 68187-27-9);

olivine, cobalt silicate blue (EINICS 269-093-5; CAS 68187-40-6);

cobalt chromite green spinel (EINICS 269-101-7; CAS 68187-49-5);

iron cobalt black spinel (EINICS 269-102-2; CAS 68187-50-8);

zinc ferrite brown spinel (EINICS 269-103-8; CAS 68187-51-9);

chrome tin orchid cassiterite (EINICS 269-104-3; CAS 68187-53-1);

tin antimony grey cassiterite (EINICS 269-105-9; CAS 68187-54-2);

chrome alumina pink spinel (EINICS 269-230-9; CAS 68201-65-0);

manganese antimony titanium buff rutile (EINICS 270-185-2; CAS 68412-38-4);

cobalt zinc silicate blue phenacite (EINICS 270-208-6; CAS 68412-74-8);

zirconium iron pink zircon (EINICS 270-210-7; CAS 68412-79-3);

victoria green garnet (EINICS 271-385-2; CAS 68553 Jan. 5);

spinels, chromium iron manganese brown (EINICS 271-411-2; CAS 68555 Jun. 6);

chrome niobium titanium buff rutile (EINICS 271-891-3; CAS 68611-42-7);

nickel niobium titanium buff rutile (EINICS 271-892-9; CAS 68611-43-8);

hematite, chromium green black (EINICS 272-713-7; CAS 68909-79-5);

nickel iron chromite black spinel (EINICS 275-738-1; CAS 71631-15-7);

zircon, cadmium yellow (EINICS 277-135-9; CAS 72968-34-4);

spinels, copper green (EINICS 305-837-8; CAS 95046-49-4)

rutiles, antimony titanium yellow orange (EINICS 305-908-3; CAS 95193-93-4)

spinels, chromium green (EINICS 306-013-0; CAS 95465-97-7-aluminium oxide (EINICS 310-073-3; CAS 102110-71-4)

silicic acid, zirconium salt, cadmium pigment-encapsulated (EINICS 310-077-5; CAS 102184-95-2)

cobalt aluminate blue spinel (EINICS 310-193-6; CAS 1345-16-0) pseudobrookite ($Fe_2TiO_5$) (EINICS 603-450-1; CAS 1310-39-0) Reaction mass of fumes, silica and diiron trioxide (EINICS 909-981-8; CAS 1353091-50-5);

reaction mass of willemite, white and zinc iron chromite brown spinel (EINICS 936-897-9; CAS 1373399-58-6).

Additionally, by way of example, the dyeing pigment is selected from the list comprising:

Pigment Red 122 (CAS No. 90-26-7);

Pigment Red 112 (CAS No. 6535-46-2);

Pigment Yellow 138 (CAS No. 30125-47-4);

Pigment blue 15:3 (CAS No. 147-14-8).

According to the invention, at least one of the one or more vehicles and the one or more dispersants comprise one or more organic or inorganic silicon compounds.

It is specified that in the context of the present disclosure, the expression "one or more organic or inorganic silicon compounds" indicates that the ink may comprise a plurality of silicon-based compounds, either belonging to the same chemical type (e.g. polysilanes having possibly different molecular weights), or belonging to different chemical types (e.g. polysilanes and polycarbodiimides).

Furthermore, it is specified that expressions such as "organic or inorganic silicon compounds" or "silicon based compounds" are used in an interchangeable manner to generically indicate compounds comprising at least one silicon atom.

Preferably, the one or more organic or inorganic silicon compounds are linear or cyclic.

The one or more organic or inorganic silicon compounds have the following general formula (formula A):

Formula A

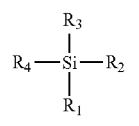

wherein $R_1$, $R_2$, $R_3$ and $R_4$ are identical or different from each other and independently comprise: H, O, C, N, B, P, S.

According to a preferred embodiment of the ink according to the invention, the one or more organic or inorganic silicon compounds are in the form of a polymer or oligomer comprising identical monomers or of the alternating, block or grafted type.

Preferably, the aforementioned organic or inorganic silicon compounds have the following general formula (formula I):

Formula I

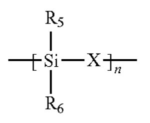

wherein X is selected from the list comprising: $SiR_7R_8$, $BR_7R_8$, O, $CR_7R_8$, $NR_7$;

wherein $R_5$, $R_6$, $R_7$ and $R_5$ are equal or different to each other and are independently selected from: hydroxyl group, linear or branched, saturated or unsaturated alkyl chains, linear or branched cycloalkyl group, linear or branched aryl group, ether group, ester group, vinyl group, acrylic group, styrenic group, alkoxy group, aryloxy group, linear or branched chains containing silicon, glycols, polyglycols, hydrogen, carbohydrates, phosphoesters, acrylic polymers, styrene-acrylic polymers, polyurethane polymers, polyminic polymers, polyetheramines, or mixtures thereof; wherein n is comprised between 3 and 1,000,000, preferably between 4 and 1,000.

Preferably, the polymer is selected from the list comprising: polysiloxane, polysilsesquioxane, polycarbonate-siloxane, polysilane, polycarbosilane, polysilsesquicarbodiimide, polysilazanes, poly(silyl) carbodiimide, polycarbosilazane, polysilsesquiazane, polyborosiloxane, poliborosilazane, silicon hydrocarbons, silicate ester, or derivatives thereof.

Furthermore, the above one or more functional groups $R_5$, $R_6$, $R_7$ and $R_8$ according to the formula I present one or more substituents selected from the list comprising: phosphate group, phosphonic group, phosphonium group, amino group, ammonium group, sulphate group, sulphonic group, carboxylic group, hydroxyl group, betainic group, acrylic group.

Furthermore, the fact cannot be ruled out from the scope of the present disclosure that the compound according to the formula I may have the respective ends functionalized with one or more of the functional groups $R_5$, $R_6$, $R_7$ and $R_8$.

According to a preferred embodiment of the ink according to the invention, the one or more vehicles comprise one or more organic or inorganic silicon compounds.

Preferably, the one or more vehicles comprise one or more organic or inorganic silicon compounds present in a concentration by weight, assessed in relation to the total weight of the medium, greater than 80%.

Advantageously, the one or more vehicles consist in one or more organic or inorganic silicon compounds.

The one or more vehicles are present in a concentration by weight, assessed in relation to the total weight of the ink, greater than 30%.

Preferably, the one or more vehicles are present in a concentration by weight, assessed in relation to the total weight of the ink, greater than 45%. Moreover, the one or more vehicles have a viscosity comprised between 2 cP and 100 cP, preferably between 10 cP and 30 cP, measured at a shear rate of 100 $sec^{-1}$ and at a temperature of 25° C.

The fact cannot be ruled out from the scope of the present disclosure that the one or more vehicles may comprise vehicles based on organic or inorganic silicon compounds and organic vehicles mixed together. In this latter case, the organic vehicles preferably comprises paraffins.

Furthermore, in the case of vehicles based on organic or inorganic silicon compounds mixed with vehicles based on organic compounds, the latter are present in a concentration by weight, assessed in relation to the total weight of the ink, lower than 30%, preferably lower than 20%.

Advantageously, the one or more dispersants are present in a concentration by weight, assessed in relation to the total weight of the ink, lower than 20%, preferably lower than 15%.

Furthermore, the one or more dispersants have a viscosity of between 100 cP and 90,000 cP, preferably between 100 cP and 5,000 cP, measured at a shear rate of 100 $sec^{-1}$ and at a temperature of 25° C.

Preferably, the one or more dispersants are based on the one or more organic or inorganic silicon compounds.

In this case, the one or more dispersants comprise the one or more organic or inorganic silicon compounds to the detailed description of which reference is fully made.

Alternatively, the one or more dispersants are based on carbon compounds.

Preferably, the one or more dispersants are selected from the list comprising: organic compounds, polymers, phosphoesters, acrylic polymers, styrene-acrylic polymers, polyurethanes, polyimines, polyetheramines, or mixtures thereof. It is essential to point out that the one or more dispersants are at least partly soluble in said one or more vehicles.

It is specified that in the context of the present disclosure, the expression "partly soluble" relates to the fact that the one or more dispersants mixed with the one or more vehicles have a unsolubilized liquid or solid phase fraction equal to 5%. In this respect, the dispersant is chemisorbed or physorbed on the surface of the ceramic or dyeing pigment particles, thus generating a repulsive action between the particles themselves due to steric and/or electrostatic effects implied by the residual surface charges present on the polymers.

During the firing process, the organic molecules leave the ceramic manufactured article together with the firing fumes through evaporation, pyrolysis and/or oxidative combustion.

On the contrary, the one or more organic or inorganic silicon compounds remain on the surface of the ceramic manufactured article.

Indeed, the one or more organic or inorganic silicon compounds, upon heating, primarily form oxides and possibly borides, carbides and nitrides.

It should be emphasized that the presence of the aforementioned organic or inorganic silicon compounds does not have any negative effect on the technological and aesthetic properties of the ceramic manufactured articles, such as resistance to chemical attack, dirtiness, color tone of the decoration and surface glossiness.

Furthermore, the ink comprises one or more additives selected from the list comprising: rheology modifiers, surfactants, surface tension modifiers, antifoaming agents, adhesion promoters, antibacterial agents, preservatives or mixtures thereof.

Preferably, the total concentration by weight of the one or more additives, assessed in relation to the total weight of the ink, is less than 10%.

Preferably, the total concentration by weight of the one or more additives is less than 5%.

In the context of the present invention, the expression "one or more additives" indicates that the ink comprises a plurality of additives, either belonging to the same chemical type (e.g., several acrylic polymers which may have different molecular weights), or belonging to different chemical types (e.g., acrylic polymers and polyminic polymers).

In detail, the rheology modifiers are at least partially soluble or dispersible in the one or more vehicles or mixture of vehicles and dispersants. Preferably, the rheology modifiers are based on the one or more organic or inorganic silicon compounds described above and to the detailed description of which reference is fully made.

In addition, the rheology modifiers may have different densities than the one or more vehicles.

For example, the rheology modifiers may preferably be silicon oils.

In this case, the one or more rheology modifiers and the one or more vehicles form emulsions.

By way of example, the rheology modifiers may be selected from the list comprising: acrylic polymers, styrene-acrylic polymers, polyurethane polymers or mixtures thereof.

Preferably, the total concentration by weight of the rheology modifiers, assessed in relation to the total weight of the ink is less than 5%.

Furthermore, the surfactants may preferably be of the ionic, non-ionic or zwitterionic type.

Furthermore, the fact cannot be ruled out that the ink according to the present invention may comprise antifoaming agents, adhesion promoters, antibacterial agents, or preservatives.

Antifoaming agents, when present in the ink, have a concentration by weight, assessed in relation to the total weight of the ink, of between 0.05% and 1%. By way of example, the antifoaming agents are of the type of silicon compounds comprising silicon oil.

Similarly, adhesion promoters, when present in the ink, have a concentration by weight, assessed in relation to the total weight of the ink, of between 0.05% and 2%.

By way of example, the adhesion promoters are selected from the list comprising: wollastonite (CaSiO3), colloidal silica, organic compounds based on titanium, zirconium or aluminum possibly functionalized with methoxy groups, metal-bound ethoxy and colloidal silicons.

Additionally, preservatives and antibacterial agents, when present in the ink, have a concentration by weight, assessed in relation to the total weight of the ink, of between 0.05% and 1%.

Additionally, again, preservatives and antibacterial agents are selected from the list comprising: benzoisotiazolinone (EINICS no. 220-120-9) and (5-cloro-2-metil-2H-isotiazol-3-one [EINICS no. 247-500-7] +2-metil-2H-isotiazol-3-one (EINICS no. 220-239-6), triazine and 2-bromo-2-nitro-1,3-propanediol. The ink according to the present invention has well-defined chemical-physical and rheological characteristics, which allow it to be applied by digital printing on ceramic manufactured articles.

In particular, the ink has a dynamic surface tension value between 20 mN/m and 40 mN/m, wherein the dynamic surface tension is measured at 25° C. It should also be pointed out that one or more organic silicon compounds decompose or cross-link on heating through interaction between them and the ceramic material on which the ink has been applied, by forming odorless compounds.

In detail, a second aspect of the present invention relates to a method for the manufacture of a ceramic manufactured article comprising the following phases:

preparing a ceramic semi-finished product;

printing the ink according to the present invention on a surface of the ceramic semi-finished product;

heat treating the ceramic semi-finished product at a temperature above 500° C. to obtain the ceramic manufactured article;

wherein the ceramic manufactured article produces an odor emission of less than 1000 OUE/$m^3$ and/or an atmospheric emission of total organic carbon (TOC) of less than 50 mg/$Nm^3$ and/or wherein the one or more organic or inorganic silicon compounds form on the surface of the ceramic manufactured article at least one odorless compound selected from the list comprising: SiOx, SiCx, SiCxOy, SiNx, SiNxOy, SiBx, SiBxOy, wherein x and y are between 0 and 6.

In particular, when in the one or more vehicles and/or in the one or more dispersants there are molecules containing limited Si and H, the heat treatment may result in the formation of SiOx wherein x is between 1 and 2.

Furthermore, when in the one or more vehicles and/or in the one or more dispersants there are molecules containing only Si and C, the heat treatment may result in the formation of SiOx, SiCx, SiCxOy wherein x and y are between 0 and 2.

Again, when in the one or more vehicles and/or in the one or more dispersants, there are molecules containing only Si and N, the heat treatment may result in the formation of SiOx, SiNx, SiNxOy wherein x and y are between 0 and 6. Finally, when in the one or more vehicles and/or in the one or more dispersants, there are molecules containing only Si and B, the heat treatment may result in the formation of SiOx, SiBx, SiBxOy wherein x and y are between 0 and 6. The formation of the aforementioned compounds is due to the fact that decoration on ceramic manufactured articles always involves a heat process of "firing".

Therefore, the fact of reducing the content of carbon-based organic molecules present in the ink for graphic decoration, by replacing a part of it with one or more silicon-based compounds, makes it possible to considerably limit the amount of carbon-based organic substances emitted by the stack.

In this regard, it should be specified that the ink according to the present invention allows reducing polluting emissions deriving from the oxidation of organic solvents during the firing of the ceramic manufactured articles.

In other words, the particular solution of providing an ink featuring the replacement of about 50% of the organic components with silicon-based compounds makes it possible to reduce the emission of combusted or semi-combusted carbon-based products by between 10% and 60%.

Furthermore, the emission of combustion products with a low-odor threshold when firing ceramics is considerably reduced.

In this regard, it should be emphasized that the use of the ink according to the present disclosure ensures the emission of total organic carbon (TOC) into the atmosphere of less than 50 mg/$Nm^3$.

It should be specified that such emissions have been quantified directly at the stack by means of FID (flame ionization detector) technology, in compliance with the UNI EN 13725:2004 standard, and on the basis of the application of 50 g/$m^2$ of ink according to the present invention, after calibration of the instrument with silicon compound-based substances. It is known, in fact, that the calibration with linear hydrocarbons leads to an overestimation of the total organic carbon concentration when silicon-based compounds are measured. In a second aspect, the present invention relates to the use of one or more organic or inorganic silicon compounds as a medium and/or dispersant in ceramic inks for digital printing, preferably for inkjet printing.

Preferably, the aforementioned organic or inorganic silicon compounds are selected from the list comprising: polysiloxane, polysilsesquioxane, polycarbonate-siloxane, polysilane, polycarbosilane, poly(silyl) carbodiimide, polysilsesquicarbodiimide, polysilazanes, polycarbosilazane, polysilsesquiazane, polyborosiloxane, polyborosilazane, silicon hydrocarbons, silicate ester.

Furthermore, the present invention relates to the use of the ink according to the present invention to decorate a ceramic manufactured article by digital printing, preferably inkjet printing.

Preferably, the ceramic manufactured article is selected from the group comprising: ceramic tiles, furnishing elements, tableware, ceramic sanitary ware and technical ceramics.

In detail, the tiles may be, e.g., unfired tiles, fired tiles, stoneware, porcelain, single-fired ceramic, double-fired ceramic, clinker, third-fired ceramic and fourth-fired ceramic.

Tableware, in turn, can be unfired tableware and fired tableware and comprises items for domestic use or furniture.

Ceramic sanitary ware comprises, e.g., sanitary ware, sinks and washbasins, shower trays.

At the same time, it is specified that the expression "technical ceramics" relates to materials used for the manufacture of components for the mechanical or biomedical sector.

The ink is heated by irradiation with IR, UV or NIR electromagnetic radiation or by heat treatment at temperatures above 500° C., and the one or more organic silicon compounds, by cross-linking or decomposition, result in emissions of total organic compounds (TOC) of less than 50 mg/Nm$^3$.

It is specified that the features of the embodiments described with reference to one aspect of the present invention are to be understood as also applying to the other aspects of the invention described herein, even if not explicitly repeated.

Examples

FORMULATION 1

| | Component | Concentration by % weight |
|---|---|---|
| MEDIUM 1 | Liquid silicon oil viscosity 10 cP at 25° C. (CAS number 9016-00-6, 63148-62-9, 64365-23-7) | 50% |
| MEDIUM 2 | Hydrocarbons, C11-C13, isoalkanes,<2% aromatic (code EINECS 920-901-0) | 6% |
| DISPERSANT 1 | Polyglyceryl-3 polydimethylsiloxyethyl dimethicone; Acrylates/ethylhexyl acrylate/dimethicone methacrylate copolymer | 4% |
| INORGANIC PART | Ceramic pigment | 40% |

FORMULATION 2

| | Component | Concentration by % weight |
|---|---|---|
| MEDIUM 1 | Liquid silicon oil viscosity 10 cP at 25° C. (CAS number 9016-00-6, 63148-62-9, 64365-23-7) | 50% |
| MEDIUM 2 | Hydrocarbons, C11-C13, isoalkanes,<2% aromatic (code EINECS 920-901-0) | 6% |
| DISPERSANT 1 | Polyglyceryl-3 polydimethylsiloxyethyl dimethicone; Acrylates/ethylhexyl acrylate/dimethicone methacrylate copolymer | 2% |
| DISPERSANT 2 | Cetyl Diglyceryl Tris (Trimethylsiloxy) Silylethyl Dimethicone | 2% |
| INORGANIC PART | Ceramic pigment | 40% |

-continued

FORMULATION 3

| | Component | Concentration by % weight |
|---|---|---|
| MEDIUM 1 | Liquid silicon oil viscosity 10 cP at 25° C. (CAS number 9016-00-6, 63148-62-9, 64365-23-7) | 48% |
| MEDIUM 2 | Hydrocarbons, C11-C13, isoalkanes,<2% aromatic (code EINECS 920-901-0) | 6% |
| DISPERSANT 1 | Polyglyceryl-3 polydimethylsiloxyethyl dimethicone; Acrylates/ethylhexyl acrylate/dimethicone methacrylate copolymer | 2% |
| DISPERSANT 2 | Cetyl Diglyceryl Tris (Trimethylsiloxy) Silylethyl Dimethicone | 2% |
| RHEOLOGY MODIFIER | Silicon oil (viscosity between 50 cP and 100 cP) | 2% |
| INORGANIC PART | Ceramic pigment | 40% |

FORMULATION 4

| | Component | Concentration by % weight |
|---|---|---|
| MEDIUM 1 | Liquid silicon oil viscosity 10 cP at 25° C. (CAS number 9016-00-6, 63148-62-9, 64365-23-7) | 40% |
| MEDIUM 2 | Hydrocarbons, C11-C13, isoalkanes,<2% aromatic (code EINECS 920-901-0) | 10% |
| DISPERSANT 1 | Polyglyceryl-3 polydimethylsiloxyethyl dimethicone; Acrylates/ethylhexyl acrylate/dimethicone methacrylate copolymer | 5% |
| INORGANIC PART | Ceramic pigment | 45% |

FORMULATION 5

| | Component | Concentration by % weight |
|---|---|---|
| MEDIUM 1 | Liquid silicon oil viscosity 10 cP at 25° C. (CAS number 9016-00-6, 63148-62-9, 64365-23-7) | 49.5% |

-continued

FORMULATION 5

| | Component | Concentration by % weight |
|---|---|---|
| MEDIUM 2 | Hydrocarbons, C11-C13, isoalkanes,<2% aromatic (code EINECS 920-901-0) | 6% |
| DISPERSANT 1 | Polyglyceryl-3 polydimethylsiloxyethyl dimethicone; Acrylates/ethylhexyl acrylate/dimethicone methacrylate copolymer | 2% |
| DISPERSANT 2 | Cetyl Diglyceryl Tris (Trimethylsiloxy) Silylethyl Dimethicone | 2% |
| SURFACTANT | Siloxanes-based gemini | 0.5% |
| INORGANIC PART | Ceramic pigment | 40% |

FORMULATION 6

| | Component | Concentration by % weight |
|---|---|---|
| MEDIUM 1 | Liquid silicon oil viscosity 10 cP at 25° C. (CAS number 9016-00-6, 63148-62-9, 64365-23-7) | 52% |
| DISPERSANT 1 | Polyglyceryl-3 polydimethylsiloxyethyl dimethicone; Acrylates/ethylhexyl acrylate/dimethicone methacrylate copolymer | 4% |
| DISPERSANT 2 | Cetyl Diglyceryl Tris (Trimethylsiloxy) Silylethyl Dimethicone | 4% |
| INORGANIC PART | Ceramic pigment | 40% |

FORMULATION 7

| | Component | Concentration by % weight |
|---|---|---|
| MEDIUM 1 | Liquid silicon oil viscosity 10 cP at 25° C. (CAS number 9016-00-6, 63148-62-9, 64365-23-7) | 50% |
| MEDIUM 2 | Hydrocarbons, C11-C13, isoalkanes,<2% aromatic (code EINECS 920-901-0) | 6% |
| DISPERSANT | Polyimine functionalized with polyesters of a fatty acid | 4% |
| INORGANIC PART | Ceramic pigment | 40% |

The invention claimed is:

1. Ceramic ink for digital printing, comprising:

at least one solid part comprising at least one ceramic pigment or dye; and at least one liquid part into which said ceramic pigment or dye is dispersed and comprising one or more vehicles and/or one or more dispersants; wherein at least one of either said one or more vehicles or said one or more dispersants comprises one or more organic or inorganic silicon compounds, and said one or more organic or inorganic silicon compounds are selected from the list comprising: polysiloxane, polysilsesquioxane, polycarbonate-siloxane, polysilane, polycarbosilane, poly(silyl) carbodiimide, polysilsesquicarbodiimide, polysilazanes, polycarbosilazane, polysilsesquiazane, polyborosiloxane, polyborosilane, polyborosilazane, hydrocarbons of silicon or silicate ester, said vehicles comprise said one or more organic or inorganic silicon compounds present in a concentration by weight, assessed in relation to the total weight of said medium, of more than 80%, and said one or more vehicles are present in a concentration by weight, assessed in relation to the total weight of the ink, of more than 30%.

2. The ceramic ink according to claim 1, wherein said one or more vehicles have a viscosity comprised between 2 cP and 100 cP, preferably between 10 cP and 30 cP, measured at a shear rate of 100 $sec^{-1}$ and at a temperature of 25° C.

3. The ceramic ink according to claim 1, wherein said one or more dispersants are selected from a list comprising: organic compounds, polymers, phosphoesters, acrylic polymers, styrene-acrylic polymers, polyurethanes, polyimines, polyetheramines, or mixtures thereof.

4. The ceramic ink according to claim 1, wherein said one or more dispersants are at least partly soluble in said one or more vehicles.

5. The ceramic ink according to claim 1, further comprising: a dynamic surface tension value comprised between 20 mN/m and 40 mN/m, said dynamic surface tension being measured at 25° C.

6. The ceramic ink according to claim 1, further comprising: at least one additive, wherein said additive is selected from a list comprising: rheology modifiers, surfactants, surface tension modifiers, antifoaming agents, adhesion promoters and antibacterial agents.

7. A method for the manufacture of a ceramic article, comprising:

preparing a ceramic semi-finished product;

printing the ink according to claim 1 on a surface of said ceramic semi-finished product; and heat treating said ceramic semi-finished product at a temperature above 500° C. to obtain said ceramic manufactured article;

wherein said ceramic manufactured article produces an odor emission of less than 1000 $QUE/m^3$ and/or an atmospheric emission of total organic carbon (TOC) of less than 50 $mg/Nm^3$.

8. The method according to claim 7, wherein said one or more organic or inorganic silicon compounds are selected from the list comprising: polysiloxane, polysilsesquioxane, polycarbonate-siloxane, polysilane, polycarbosilane, poly(silyl) carbodiimide, polysilsesquicarbodiimide, polysilazanes, polycarbosilazane, polysilsesquiazane, polyborosiloxane, polyborosilane, polyborosilazane, hydrocarbons of silicon or silicate ester.

9. The method of claim 7, wherein the ink has a viscosity between 2 cP and 100 cP, preferably between 10 cP and 30 cP, measured at a shear rate of 100 $s^{-1}$ and at 25° C.

10. The method of claim 7, wherein the ink comprises one or more dispersants selected from organic compounds, polymers, phosphoesters, acrylic polymers, styrene-acrylic polymers, polyurethanes, polyimines, polyetheramines, or mixtures thereof.

11. The method of claim 7, wherein the dispersant is at least partly soluble in the vehicle.

12. The method of claim 7, wherein the ink has a dynamic surface tension between 20 mN/m and 40 mN/m at 25° C.

13. The method of claim 7, wherein the ink further comprises at least one additive selected from rheology modifiers, surfactants, surface-tension modifiers, antifoaming agents, adhesion promoters, and antibacterial agents.

* * * * *